April 29, 1941. H. L. BLOOD 2,239,986
MOUNTING FOR ROTARY TOOL SPINDLES AND THE LIKE
Original Filed Sept. 15, 1937
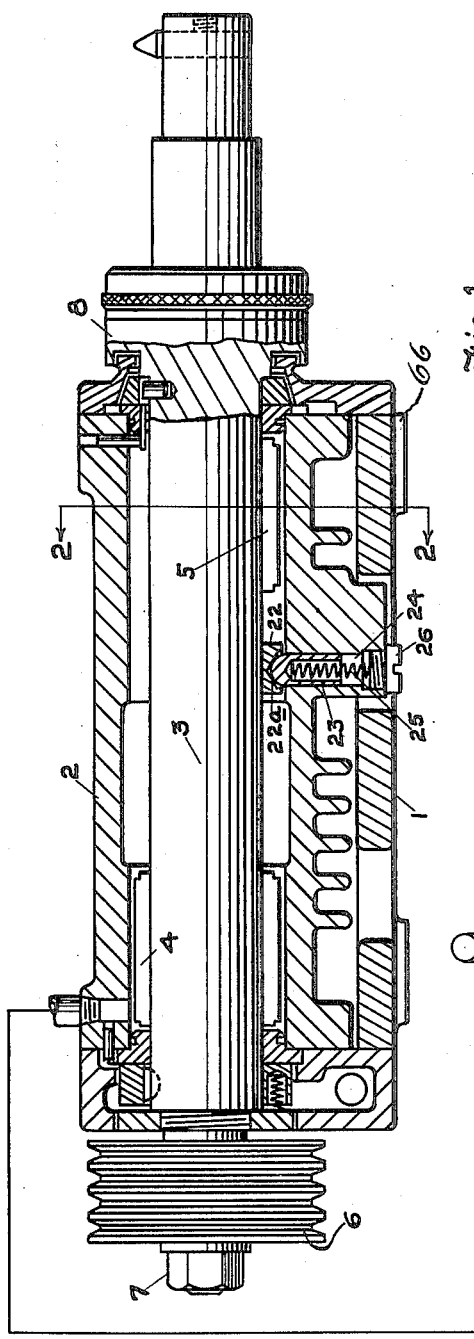
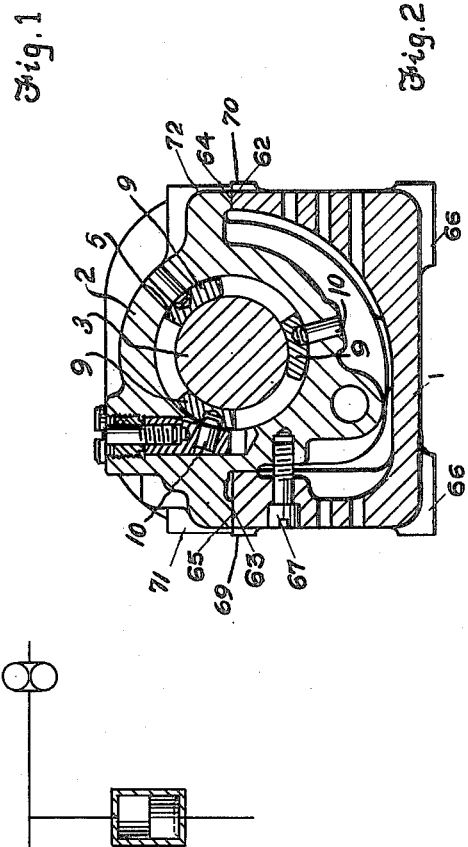
Inventor
Harold L. Blood
By Geo. H. Kennedy Jr.
Attorney Patented Apr. 29, 1941

2,239,986

UNITED STATES PATENT OFFICE 2,239,986

MOUNTING FOR ROTARY TOOL SPINDLES AND THE LIKE

Harold L. Blood, Worcester, Mass., assignor to The Heald Machine Company, Worcester, Mass., a corporation of Massachusetts Original application September 15, 1937, Serial No. 163,983. Divided and this application September 2, 1938, Serial No. 228,195

4 Claims. (Cl. 308—15)

The present invention relates to mountings for rotary spindles, such as used, particularly in various kinds of machine tools, for the high speed rotation of boring, grinding or other cutting tools; the present application is a division of applicant's copending application, Serial No. 163,983, filed September 15, 1937.

In boring, grinding and similar machines, the housing or mounting for the spindle which carries the tool or in some cases a rotary workholder is generally fastened securely to the base or to the reciprocatory table of the machine and as the housing becomes heated, through high speed rotation of the spindle, the distance of the spindle axis from the machine base or table may be slightly increased by reason of the expansion of the metal of the housing. Although this expansion is very small, it does detrimentally affect the use of the machine where precision machining of workpieces is essential. Where the dimension of bored, turned, ground or otherwise machined surfaces must be accurate to within very small limits, as for example, one or two ten thousandths of an inch, the expansion of such a spindle mounting or housing, with its consequent elevation of the spindle axis may frequently result in the rejection of many of the pieces machined. One of the principal objects of the present invention is to avoid or minimize such changes in the position of the tool spindle relative to the portion of the machine on which the spindle mounting rests, in spite of extreme changes in temperature of said mounting.

Where a plurality of spindles are mounted side by side to make possible the performance of simultaneous machining operations on a plurality of workpiece surfaces at one time, expansion of the spindle mountings resulting from rotation of the spindles therein frequently varies the spacing of adjacent mountings by reason of the expansion of the metal in the spindles and their supports. A further object of the present invention is to make possible the mounting of a plurality of spindles side by side so that the spacing of their mountings, even though they may be in contact with each other, will not be affected by expansion or contraction of said spindle mountings, due to changes in temperature.

It is obvious that the difficulty with the expansion and contraction of the material of such a spindle mounting can be overcome by making the entire mounting of a metallic alloy having substantially no expansion as a result of increases in temperature, but such metal is relatively expensive and, in many cases, more difficult to machine than the more common metals, and thus a spindle mounting composed entirely of a low-expansion metal would be impractical and almost prohibitive in cost. According to my invention these difficulties are overcome, as hereinafter described, by using ordinary metal for that portion of the mounting which houses the spindle, and by using a low-expansion metal for the supporting portion of said mounting,—thus making for much cheaper manufacture.

Other and further objects and advantages of the present invention will more fully appear from the following detailed description taken in connection with the accompanying drawing, in which—

Fig. 1 is a longitudinal sectional view of a spindle mounting embodying the invention.

Fig. 2 is a sectional view along the line 2—2 of Fig. 1.

Like reference characters refer to like parts in the different figures.

The drawing shows my invention in its application, for example to the tool head of a boring machine of the type depicted by Schmidt Patent No. 2,058,359, dated October 20, 1936. However, this showing is merely illustrative, it being apparent that my invention is applicable to a wide variety of uses, including the mounting of spindles employed for the rotation of workpieces, as well as of cutting tools.

Referring to said drawing, my improved spindle mounting provides a U-shaped supporting portion 1 and a housing portion 2, the latter being the portion in which the spindle 3 is journalled. In said housing 2, the spindle is journalled on axially spaced bearings 4 and 5 which are represented as rocking shoe bearings. The spindle has a pulley 6 at one end thereof suitably secured against rotation on the spindle, as by a clamping nut 7, the pulley being engaged by a driving belt, not shown, for obtaining high speed rotation of the spindle. The opposite end of the spindle has a face plate 8 to which a boring tool or a workholder may be fastened. The rocking shoes 9 which provide the bearings 5 are supported in the housing 2 by pins 10; it will be understood that other types of bearings may be utilized when desired.

The weight of the spindle is counterbalanced by a shoe 22 positioned on the underside of the spindle substantially midway between the bearings 4 and 5. The shoe 22 has a recess 22a in the outer or underside thereof for engagement with a plunger 23 vertically slidable in a bore 24 in the housing 2. A coil spring 25 positioned between the plunger 23 and a cap 26 urges the plunger upwardly and holds the shoe 22 against the underside of the spindle. The spring is selected to exert an upward pressure on the spindle substantially equal in amount to the weight of the spindle.

The support 1 is made of a low-expansion material and has flat machined surfaces 62 and 63 which cooperate with corresponding flat surfaces 64 and 65 on the housing 2 to support and locate the housing so that the normal axis of rotation of the spindle 3 shall be exactly parallel to the underside of the bosses 66 on which the support rests when mounted on a machine. Suitable bolts 67 may hold the support 1 and housing 2 in proper relation to each other. The provision of a separate support 1 to which the housing 2 is positively secured makes possible a housing having a much thinner wall between the bore thereof and the outside, thereby reducing the weight of the spindle mounting. The support 1 provides rigidity for the housing and makes possible the formation of an air passage between the U-shaped support 1 and the housing for cooling.

The separate support 1 for the housing also makes the position of the spindle axis practically independent of the expansion and contraction of the ordinary metal of which the housing 2 is composed, by reason of the heating and cooling thereof so that the spindle 3 always rotates on an axis having a fixed relation to the pads 66. To this end the machined surfaces 64 and 65 are substantially in a horizontal plane passing through the spindle axis, and the support 1 is formed, as above stated, of a material having a low coefficient of thermal expansion. Thus, any expansion of the housing 2 by heating thereof has practically no effect on the vertical position of the spindle axis relative to the machine base or table on which the tool head is mounted.

Tool heads of this character, as above stated, are frequently mounted side by side on a machine for simultaneous machining operations on a plurality of surfaces. The support 1 has integral pads or locating surfaces 69 and 70 on opposite sides thereof which aid in locating each tool head in relation to adjoining tool heads. The lateral edges 71 and 72 of the housing 2 are slightly less widely spaced than the surfaces 69 and 70 (the difference in spacing being extremely small in the arrangement shown and is exaggerated in the drawing) and any expansion of the housing 2 will thus not result in engagement between adjacent housings even though adjoining heads may have the pads 69 and 70 in contact. The lateral spacing of separate heads is thus entirely independent of any heating or cooling thereof.

Since the support 1 and housing 2 are separate elements, the support 1 may be made of a suitable low-expansion material without requiring a great amount of this material and the housing 2 may be of a lower cost material which is also more readily machined. The cost of the entire head is therefore much less than would be the case if the same were made throughout from low-expansion material. The two piece construction provides the advantages above outlined without the cost of making the entire spindle mounting of low-expansion material.

To assure the proper functioning of the tool head, independent of temperature changes, the housing 2 is preferably made of a material having a coefficient of thermal expansion substantially equal to the coefficient of thermal expansion of the spindle. Thus, as the housing and spindle become heated, when in operation, the clearance between the surfaces of the rocking shoe bearings and the cylindrical surface of the spindle cooperating therewith remains constant independent of the changes in temperature of the several elements. In cases where extreme accuracy is required it may be desirable to take into consideration the coefficient of thermal expansion of the material of the rocking shoe bearings in addition to the expansion of the housing and spindle, so that the operative clearance between the bearing surfaces and the cooperating spindle surface may be maintained precisely constant throughout any temperature changes occurring in the tool head.

I claim:

1. In apparatus of the class described, a rotary spindle, bearings for said spindle, and a mounting for said spindle and its bearings to maintain the spindle axis substantially at a predetermined level, said mounting comprising a housing of ordinary relatively-expansible metal surrounding and enclosing said bearings and said spindle, and a separate support for said housing, composed of low-expansion metal, said support being out of supporting contact with said housing except at surfaces in or above the horizontal plane of the spindle axis, thereby permitting expansion of said housing to occur, without appreciably raising the level at which said spindle axis is maintained by said mounting.

2. In apparatus of the class described, a rotary spindle, bearings for said spindle, and a mounting for said spindle and its bearings to maintain the spindle axis substantially at a predetermined level, said mounting comprising a housing of ordinary relatively-expansible metal surrounding and enclosing said bearings and said spindle, and a separate support for said housing, composed of low-expansion metal, said support being substantially U-shaped in cross-section to receive said housing between its sides in non-contacting relation, and with its supporting engagement with said housing confined to areas substantially in or above the horizontal plane of the spindle axis.

3. A mounting for rotary tool spindles and the like, comprising bearings for the spindle, a housing surrounding and enclosing said bearings and said spindle, and a separate support for said housing by which to position the axis of said spindle at a predetermined level, said support being composed of low-expansion metal, and being in supporting contact with said housing only at or above the level of the spindle axis, whereby expansion of said housing can occur without appreciably affecting the level at which said spindle axis is held by said support.

4. A mounting for rotary tool spindles and the like, comprising bearings for the spindle, a housing surrounding and enclosing said bearings and said spindle, and a separate support for said housing by which to position the axis of said spindle at a predetermined level, said support being composed of low-expansion metal, and being in supporting contact with said housing only at or above the level of the spindle axis, whereby expansion of said housing can occur without appreciably affecting the level at which said spindle axis is held by said support, and means for holding said housing and support in assembled relation without appreciable restraint on the freedom of said housing to expand in all directions.

HAROLD L. BLOOD.